(No Model.)
W. H. APPLEGATE.
ELECTRIC RAILWAY.
No. 465,613. Patented Dec. 22, 1891.
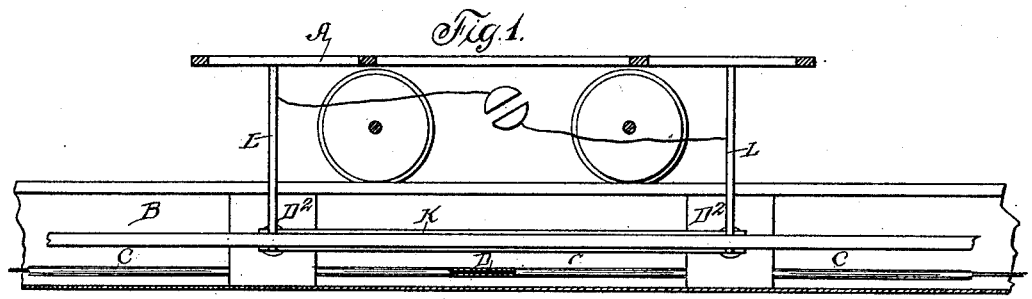
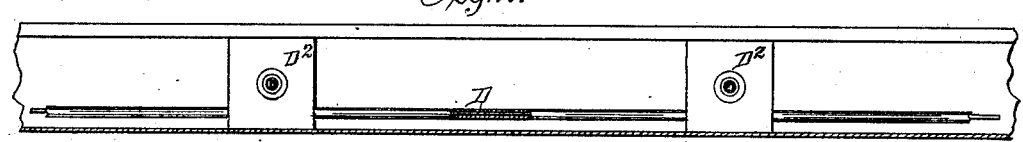
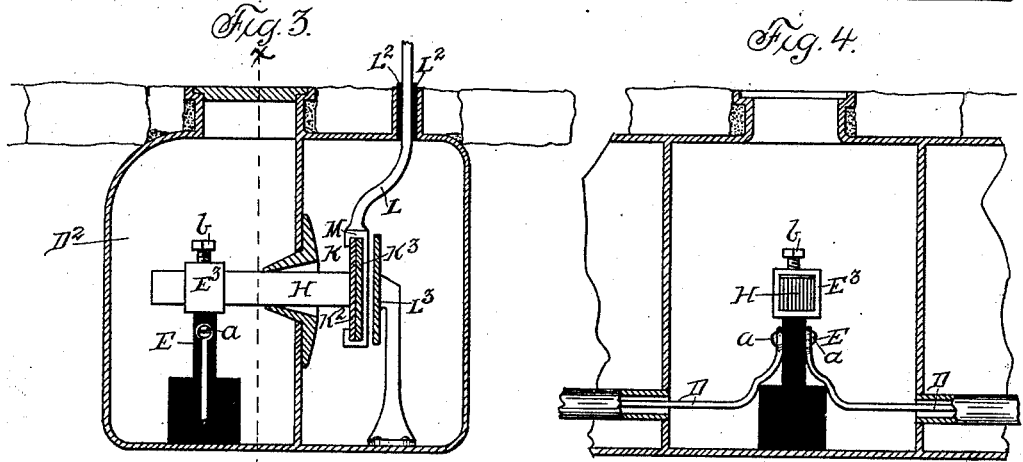
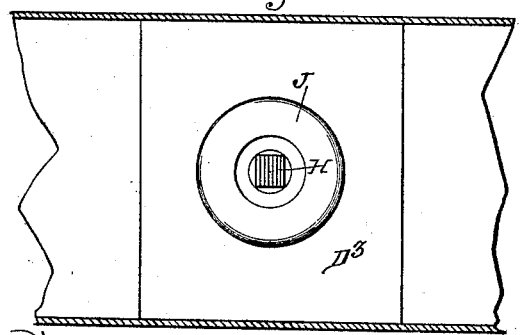
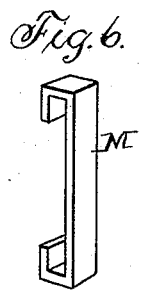
Witnesses: M. P. Smith, Charles C. Bulkley
Inventor: William H. Applegate, By Thomas G. Orwig, Atty.

UNITED STATES PATENT OFFICE.

WILLIAM H. APPLEGATE, OF ATLANTIC, IOWA, ASSIGNOR TO THE INTERNATIONAL ELECTRIC RAILWAY COMPANY, OF CHICAGO, ILLINOIS.

ELECTRIC RAILWAY.

SPECIFICATION forming part of Letters Patent No. 465,613, dated December 22, 1891.

Application filed November 10, 1890. Serial No. 370,986. (No model.)

*To all whom it may concern:*

Be it known that I, WILLIAM H. APPLEGATE, a citizen of the United States, residing at Atlantic, in the county of Cass and State of Iowa, have invented a new and useful Improvement in Electric Railways, of which the following is a specification.

My invention appertains to that class of railways operated by electricity in which the conductor or main lead of the system is contained within an underground conduit.

My object is to provide improved means by which the fixed stationary lead-conductor carrying the current from the generating source may be inclosed in an insulating-casing within the conduit, contact being made with a traveling conductor electrically connected with the motor of a propelled vehicle or car at intervals.

My object, further, is to provide means by which a traveling conductor is employed which adapts itself to the sinuosity of curves and which maintains contact electrically with the main lead without exposing the entire length thereof.

My object, further, is to provide means by the conjoint arrangement of several devices in such a manner as that approximately perfect contact may be insured and the various operative parts within the conduit protected from the water, dirt, snow, &c.

My invention consists in a traveling flexible conductor electrically connected with the motor of the propelled vehicle or car, which shall contact with exposed points or brushes arranged and disposed at intervals on the length of a fixed stationary conductor contained within an insulating and protecting casing, which latter is extended within the conduit of the system.

My invention consists, further, in a hollow inclosing casing which may be made up in sections, through which the lead-conductor from the source is extended, and contact-boxes at intervals between these sections, so that the latter open into or communicate with the contact-boxes, said sections and boxes extending and being within the underground conduit of the system.

My invention consists, further, in a traveling conductor electrically connected with the motor of a propelled vehicle constructed of a long flexible metallic strip of high conducting qualities and a spring metallic backing-piece adapted to normally cause the flexible conductor to remain in a straight line, but permitting said conductor to conform to the sinuosity of curves, together with a stationary guiding-piece extending and fixed within the conduit, which serves to maintain contact and also protect and guard the exposed points of the fixed conductor and the traveling conductor.

My invention consists, further, in certain details of construction more particularly to be described, reference being had to the accompanying drawings, in which—

Figure 1 represents a longitudinal section of an underground conduit, showing the sections of casing, contact-boxes, traveling conductor, and guiding-piece, together with a propelled car. Fig. 2 is a like view showing the contact-boxes and the sections of casing, one of the latter being broken away to show the stationary conductor. Fig. 3 is an enlarged transverse sectional view showing the contact-brushes, their connection with the fixed conductors, the traveling conductor in contact, and the guiding-piece. Fig. 4 is a sectional view on the line $x\,x$, Fig. 3. Fig. 5 is a face view of one of the contact-boxes. Fig. 6 is a detail view of one of the insulating-clips.

A designates an electrically-propelled car, and B the conduit, which latter is slotted in the usual well-known manner.

C are sections of the hollow inclosing casing through which the lead-conductor from the generating source is extended, as represented by D, and $D^2$ are contact-boxes disposed at intervals within the conduit B, the sections of hollow casing C extending between the said contact-boxes and having communication with the interior thereof, so that the lead-conductor D may be connected within each of said boxes in the manner described, as follows, reference being had to Figs. 3 and 4.

E is a supporting-standard of suitable conducting material, mounted upon the insulating-block $E^2$. To each side of the conducting supporting-piece E the main lead-conductor D may be secured by means of the binding-screws a a.

The interior walls of the contact-boxes D² are suitably covered with insulating material. The incasing sections C, if of wood or like material, may be treated in such a manner as to insulate the main lead D from escapement, care being exercised in making joints to provide against short-circuiting. The space between conductor D and casing C may be packed with suitable insulating material.

At the point of connection between the contact-boxes D² and the inclosing casing C, if the latter are metallic and the main lead D insulated, provision must be made for expansion and contraction.

To the upper end of the standard E is fixed a binding and holding collar E³, adapted to adjustably hold the rear portion of the metallic conducting and wiping brush H, which latter is preferably made up of a number of strips of a good conducting metal, a binding-screw b being employed to fixedly hold the brush H in place, which latter extends or protrudes beyond the face of the contact-box D³ into the conduit B.

Referring to Fig. 5, J is an insulating-piece fixed on the face of the contact-boxes D², having a flared or concaved perforation at its center, through which the brush H is protruded, said concaved perforation permitting said brush to wipe upon the traveling conductor, about to be described, in either direction of travel of the vehicle to which said conductor may be attached, thus insuring an approximately perfect contact.

Referring now to the form of the traveling conductor designated by K, it consists of a long strip of metal K², Fig. 3, of high conductivity, against one exposed face of which the brush H wipes. This strip K² has a backing of a strip of spring-steel K³ or other elastic material adapted for this purpose, which is secured to the strip K², said conjoined strips K² and K³ being supported at their ends by means of the conducting-arms L L, depending from the car A and being electrically connected with the propelling-motor of the car. By means of this flat and wide-faced conductor the rocking motion of a car cannot lift it to disconect it from the brush, because the face of the conductor is in a vertical plane and wide enough to allow vertical motion to the conductor relative to the brushes H.

L² L² are blocks of insulating material secured to the depending arms at the point where they pass between the slot-irons.

L³ is a continuous metallic bar or rail, which is secured to the side of the conduit and extends throughout the whole length of the conduit of the system, being adapted to preserve the traveling conductor K from lateral motion out of contact with the brushes H.

Before connecting the depending arms L L with the conductor K the clips M may be first slipped over and upon the conductor-strips K, said clips being made of any suitable insulating material and adapted to prevent the short-circuiting of the current in the conductor K into the guiding-rail L³.

It will be observed by referring to Fig. 3 that the depending arms L L are angularly bent, so that the conductor K contacts with the brushes H at a point to one side of the conduit-slot, so that the water, snow, and dirt will not be precipitated upon the points of contact between the traveling conductor K and brushes H. The guide-rail L³ also serves as a guard or shield for the contact.

The conducting-strip K² of conductor K is of such a width as to be always in contact with the brushes H independently of the vertical motion of the car and of such a length as to be in contact at all times with one of the brushes H and at certain times with two of the said brushes. By this means a continuous current passes into the motor. It is also apparent that the stationary conductor D is conveniently arranged and inclosed within a protecting-casing in the conduit and a traveling conductor provided which makes contact with said conductor at points at intervals on the length of the fixed or main lead conductor.

Having thus described my invention, what I claim as new, and desire to secure by Letters Patent, is—

1. In an electric railway, an underground conductor extending parallel with a track and having contact points or brushes connected therewith at intervals to extend horizontally, and a car carrying a flat-sided conductor, with its broad faces extending vertically and at right angles to the contact points or brushes, connected with the underground conductor to operate in the manner set forth, for the purposes stated.

2. In an electric railway, a propelled car, an underground conduit, a main conductor from source of generation, an inclosed casing through which the main conductor is extended, contact-boxes arranged at intervals on the main conductor, contact points or brushes exposed through the sides of the contact-boxes and attached to the main conductor within and to extend longitudinally, and a car carrying a flat-sided conductor, with broad faces extending vertically and at right angles to the said contact points or brushes, to operate in the manner set forth.

3. In an electrical railway, a propelled vehicle and underground conduit, and a traveling conductor consisting of a horizontally-arranged strip of metal of high conductivity and a backing-strip of springing material, and means for connecting said conductor electrically with the propelling mechanism of the car, as set forth.

4. In an electrical railway, a propelled car, an underground conduit, a traveling conductor constructed of a strip of conducting material and a backing of springing metal, and means for electrically connecting said traveling conductor with the motor of the car, as set forth.

5. In an electrical railway, a propelled car, an underground conduit, sections of casing, a series of contact-boxes with which the sections communicate at intervals, a fixed main-lead conductor extended through the sections of casing and inclosed thereby, a conducting-support, a series of conducting-strips constituting a brush adjustably held on said support, said strips extended beyond the face of the contact-box, an insulating-piece fixed to the face of the contact-box, having a flared or concaved perforation therein, and a traveling conductor wiped by said brush, electrically connected to the propelling mechanism of the car, together with a fixed guide-rail adapted to maintain contact, as and for the purposes set forth.

6. In an electrical railway, a propelled car, an underground conduit, sections of casing extended in said conduit, contact-boxes at intervals, with which said casing communicates, a main conductor connected to a conducting-support, a contact-brush held by said support, together with means of adjustment of said brush, the latter protruding beyond the contact-box, a traveling conductor of such a length as to span the distance between the contact-boxes and of such width as to maintain contact independently of the vertical movements of the car, means for connecting electrically said conductor with the propelling mechanism of the car, and a guide-rail fixed to and extended within the conduit, as set forth.

7. In an electric railway, a propelled car, arms depending therefrom and extended within an underground conduit, said arms being angularly bent, a horizontally-arranged traveling conductor secured to the said arms, consisting of a strip of conducting material and a strip of elastic backing material secured to said conducting material, a guiding and shielding rail extended within and secured to the conduit, and insulating-pieces carried by the traveling conductor, interposed between said conductor and the guide-rail, as set forth.

8. An electric railway comprising an underground conduit, a continuous main-supply conductor, a plurality of sections of casing inclosing the continuous main conductor within the conduit, and an electrically-propelled car, arms depending from said car approximately at each end thereof in circuit with the motor of the car, a traveling conductor consisting of a conducting-strip and spring-backing held by said arms, contact-boxes having contact-brushes adapted to wipe the traveling conductor in circuit with the main-supply conductor, and a continuous guide-rail secured within the conduit, as and for the purposes set forth.

9. A contact device for électric railways, consisting of a supporting-standard of conducting material to which the leads are connected, a holding-collar fixed to said support, a plurality of contact-strips adjustably held in said collar, a contact-inclosing box, and a face-plate on the exterior of said box, having a flared or concave opening through which the contact-brush protrudes, as set forth.

WILLIAM H. APPLEGATE.

Witnesses:
CHARLES C. BULKLEY,
THOMAS G. ORWIG.